United States Patent [19]

Scott, Jr. et al.

[11] 3,856,616

[45] Dec. 24, 1974

[54] PHENOLIC RESIN-CONTAINING CELLULOSIC OVERLAYS FOR WOODY SUBSTRATES

[75] Inventors: James E. Scott, Jr., Homewood, Ill.; Ernest Ray Woodward, Seattle, Wash.

[73] Assignee: Pacific Resins & Chemicals, Inc., Seattle, Wash.

[22] Filed: Nov. 9, 1972

[21] Appl. No.: 305,000

[52] U.S. Cl............... 162/165, 260/17.2, 260/57 A
[51] Int. Cl............................ D21d 3/00, D21h 3/50
[58] Field of Search .......... 260/17.2, 57 A; 162/165

[56] References Cited
UNITED STATES PATENTS

| | | | |
|---|---|---|---|
| 2,643,186 | 6/1953 | Tower | 162/165 |
| 2,666,726 | 1/1954 | King et al. | 156/220 |
| 2,748,046 | 5/1956 | Works et al. | 156/64 |
| 2,786,008 | 3/1957 | Herschler | 161/246 |
| 2,804,418 | 8/1957 | King | 161/262 |
| 2,885,386 | 5/1959 | Straka et al. | 260/57 |
| 3,006,893 | 10/1961 | West et al. | 260/17.2 |
| 3,058,843 | 10/1962 | Herschler | 117/122 |
| 3,519,468 | 7/1970 | Brown et al. | 117/65.2 |
| 3,558,559 | 1/1971 | Blanc | 162/165 |
| 3,632,537 | 1/1972 | Paleologo et al. | 260/57 |

*Primary Examiner*—Melvin Goldstein
*Assistant Examiner*—Edward Woodberry
*Attorney, Agent, or Firm*—Christensen, O'Connor, Garrison & Havelka

[57] ABSTRACT

Disclosed are improved resin-containing, cellulosic overlays for overlaying woody substrates and processes for preparing same. The overlays are produced by admixing an aqueous slurry of cellulosic fibers and a high molecular weight, alkaline, water-solubilized, phenol-formaldehyde resole resin and then precipitating the resin with an acidic agent selected from sulfuric, hydrochloric, phosphoric, acetic, citric and p-toluenesulfonic acids. The preferred resin used in the overlays is prepared by the base-catalyzed methylolation of an acid-catalyzed phenol-formaldehyde novolac resin having a formaldehyde : phenol mole ratio of from 0.6 to 0.95. Methylolation is effected by reacting the novolac resin at moderately elevated temperatures with sufficient formaldehyde so that the resulting resole resin has a formaldehyde : phenol mole ratio of from 1.4 to 2.0.

34 Claims, No Drawings

PHENOLIC RESIN-CONTAINING CELLULOSIC OVERLAYS FOR WOODY SUBSTRATES

BACKGROUND OF THE INVENTION

This invention relates to resin-containing cellulosic overlays useful for masking surface imperfections of woody substrates and improving the paintability, abrasion resistance and weathering properties thereof.

Such overlays are well known in the art and are generally prepared using one of two methods. In one method a liquid resin generally comprised of low molecular weight polymers is applied to a performed paper sheet such as by immersing the sheet in a saturating or impregnating resin bath. The sheet is then dried prior to application to a substrate. This invention does not relate to overlays produced by this method; rather, it relates to a method commonly referred to as the "beater-addition method." In this method an aqueous, alkaline solution of a phenol-formaldehyde resole resin is added to the aqueous slurry of cellulosic fiber and the resulting furnish is thoroughly mixed to obtain uniform resin distribution. The resin is precipitated onto the fibers by acidification of the slurry. The slurry is then converted into a wet sheet using conventional paper-making apparatus, the wet sheet then being dried. The resulting hard-surfaced, flexible, tough and substantially opaque sheet can be applied to plywood, lumber, particle board or similar woody substrate using one of many commercially available adhesives useful for this purpose. Typically, heat and pressure are applied to the substrate-overlay laminate to assure complete bonding therebetween.

Panels and boards surfaced with overlays prepared by the beater-addition method have found a wide range of applications where smooth, uniform, substantially opaque surfaces that will resist weathering and abrasion and readily accept paint are required. Among these applications are siding, soffit and panel application in buildings; traffic signs; and planking, bulkheads and transoms on boats.

Prior art beater-addition overlays, however, have not been without shortcomings. Paramount among these is the limited internal bond of the sheet (internal bond being a measure of Z-directional tensile strength, i.e., perpendicular to the plane of the sheet). When an overlay-substrate laminate is worked with hand or power tools, partial delamination of the overlay sometimes results. The limited internal bond of prior art beater-addition overlays has also discouraged or prohibited their use in certain applications where their other properties (e.g., opacity and paintability) would make them ideal. For example, plywood surfaced with beater-addition overlays are attractive for use as large freeway signs because of their weathering and paintability properties. They have not been widely accepted, however, because adhesive-backed letters and numbers cannot be removed from such signs without risking that portions of the overlay will peel off as well. This, of course, limited the feasibility of changing the sign information from time to time.

In the prior art commercial manufacture of beater-addition overlays, the amount of resin solids introduced into the beater has typically been from 20% to 35% by weight based on the dry fiber weight ("BODF"). Since the tensile strength and internal bond of beater-addition overlays generally increase with increasing resin content, the solution to the low internal bond problem just referred to would appear to be to increase the amount of resin employed. However, this has not been an economically attractive solution for several reasons, one being that disproportionately large increases in resin addition have been necessary to obtain significant property improvements, i.e., property response to increasing resin additions has been low. For example, in one experiment increasing the amount of typical prior art beater-addition resin, "Amres 1410" (a phenolic resin produced by Pacific Resins and Chemicals, Inc.), from 33% to 45% BODF increased internal bond from 385 to 450 psi; thus, a 36% resin increase improved internal bond by only 17%.

Low resin retention has been another problem experienced in the production of beater-addition overlays. Typically, in the production of laboratory handsheets using prior art resins, only about 45% of resin solids added to the fiber pulp are retained in the resulting sheet. In comercial production of beater-addition overlays, the retention rate is nearer to 70% due to the build up of fiber fines and soluble resin constituents in recirculated white water. The resin constituents derived from white waters, however, do not appear to contribute significantly to strength or internal bond of the overlay. This low resin retention rate creates both pollution and economic problems. Much effort has been expended to improve resin retention, but until now, no significant improvements have been made.

Broadly, it is the object of this invention to provide improved beater-addition overlays of type heretofore discussed and to overcome or mitigate the mentioned shortcomings of prior art methods of producing such overlays.

SUMMARY OF THE INVENTION

In summary, this invention is directed to an improvement in a process for producing cellulosic overlays useful for overlaying woody substrates. In the process to which the improvement of this invention relates, an aqueous slurry of cellulosic fibers is admixed with an alkaline, water-solubilized phenol-formaldehyde resole resin. The resin is precipitated onto the fibers by acidification of the slurry, a sheet is formed from the acidified slurry and the sheet is dried. In the improvement of this invention, the resin is produced by condensing phenol and formaldehyde under acidic conditions to form a novolac resin having a formaldehyde : phenol mole ratio of from 0.6 to 0.95 and methylolating the novolac with sufficient additional formaldehyde to produce a resole resin having a formaldehyde : phenol mole ratio of from 1.4 to 2.0; and acidification of the slurry is effected by adding to the slurry an acid selected from sulfuric, hydrochloric, phosphoric, acetic, citric and p-toluenesulfonic acids. This invention is also directed to overlays produced by the improved process of this invention.

DETAILED DESCRIPTION OF THE INVENTION

This invention is based on the discovery of a resin-precipitant combination, which when employed in the conventional method of producing overlays by the beater-addition method will enable the production of overlays exhibiting much improved physical properties, their improved internal bond being particularly noteworthy. Through the use of this resin-precipitant combination marked improvements in resin retention and property response to increasing resin additions can also be obtained.

Resins. The resins used in this invention are high-molecular weight, phenol-formaldehyde resole resins having formaldehyde : phenol mole ratios of from 1.4 to 2.0. The resins of this invention are preferably prepared by a two-stage process, the first stage involving the formation of a phenol-formaldehyde novolac resin by the acid-catalyzed condensation of from 0.6 to 0.95 mole of formaldehyde per mole of phenol. This novolac resin should be essentially free of free phenol. The second stage involves the base-catalyzed methylolation of the novolac resin using sufficient additional formaldehyde to produce a final resole resin having a formaldehyde : phenol mole ratio of from 1.4 to 2.0. The reaction conditions (particularly the reaction temperature) used in the second stage should be gentle so as to minimize crosslinking of the novolac backbone, favor methylolation and minimize further condensation. Preferably, the second stage of the reaction is carried out at temperatures of from 40° to 80°C., and most preferably about 60°C. Preferably the resins used in the process of this invention have number-average molecular weights of from 850 to 950 and weight-average molecular weights of from 2,850 to 3,150.

In the first stage the formaldehyde : phenol mole ratio is preferably from 0.7 to 0.9, more preferably from 0.75 to 0.85, and most preferably about 0.8. In the second stage, the amount of formaldehyde added is preferably such as to yield a final resin having a formaldehyde : phenol mole ratio of from 1.5 to 1.7, more preferably a mole ratio of from 1.55 to 1.65 and most preferably about 1.6. Other aldehydes, such as furfuraldehyde and acetaldehyde, can be substututed for formaldehyde.

The preferred method of preparing the resins used in this invention is as follows: a reactor equipped with a reflux condenser, agitator, and heating and cooling means is charged with phenol (preferably 80 – 100% concentration; most preferably about 90%). For each mole of phenol is then added from 0.004 to 0.010 equivalents of a water-soluble acid catalyst (e.g., sulfuric acid, hydrochloric acid, p-toluenesulfonic acid and oxalic acid; sulfuric acid being preferred) and 0.8 mole of aqueous formaldehyde. At this point, the pH is within the range of from 0.5 to 1.5. The reaction mixture is then heated to reflux (about 100°C.) and maintained at reflux for 1 to 2 hours (most preferably about 1.5 hours). Very shortly after reaching reflux, e.g., 5 minutes, the formerly clear resin solution becomes milky, signifying the formation of two phases. During the heat-up to reflux, intermittant cooling is generally required to maintain control of the exothermic reaction.

After the reflux period, the resin is then cooled and sufficient base is added to adjust the pH to from 8.0 to 11.0; preferably about 10.0. The preferred base is sodium hydroxide, but other alkali metal hydroxides, ammonium hydroxide and amines, such as triethylamine and triethanolamine, may also be used. Additional formaldehyde is then added (sufficient to provide a final formaldehyde : phenol mole ratio of from 1.4 to 2.0) and the reaction mixture is preferably maintained at temperatures of from 40° to 80°C. (most preferably about 60°C.) until its viscosity has substantially stabilized, signifying substantial completion of formaldehyde consumption. The resin is then cooled to room temperature. Methanol or other solvents can be added before or after the methylolation is effected in order to decrease the viscosity of the final resin and thereby make it easier to pump and handle. Additional base can also be added to increase the water-dilutability of the resin.

Precipitants. Papermaker's alum ($Al_2(SO_4)_3 \cdot 14H_2O$), acetic acid, phosphoric acid and mixtures of alum and sulfuric acid have been mentioned in the prior art as suitable acidic agents for effecting resin precipitation in the preparation of beater-addition overlays. In the prior art commercial manufacture of beater-addition overlays, alum has been used to the substantial, if not complete, exclusion of the other precipitants that have been proposed. Quite surprisingly, we have found that if alum is used to precipitate the resin used in this invention, the results are not substantially better than those obtained using prior art methods. However, if in accordance with this invention, the resin is precipitated by the use of sulfuric hydrochloric phosphoric, acetic, citric or p-toluenesulfonic acids (or mixtures thereof), dramatic improvements are obtained, particularly at resin solids addition levels above 30% by weight based on the weight of dry fiber. Sulfuric acid is preferred for use in this invention.

As is shown in the following examples, overlays produced by the process of this invention exhibit internal bond, abrasion resistance and resin retention values superior to those of overlays prepared using a resin typical of those used in the prior art.

EXAMPLE 1

Into a 2-liter resin flask equipped with agitator, heating mantle, cooling coils and reflux condenser was added sequentially with agitation 669 g. molten USP phenol (100% concentration), 341 g. of 50% formalin (warmed to 35°C.), 100 g. water and 2.4 g. 72% sulfuric acid. This mixture was heated from about 30°C. to about 50°C. whereupon a strong exotherm occurred. Heating was discontinued and cooling was applied as needed to maintain a gradual temperature increase to about 85°C. where the exotherm subsided. The reaction mixture was then slowly heated from 85°C. to reflux (approximately 100°C.). The total heat-up time from 30°C. to reflux was approximately 1 hour. The reaction mixture was maintained at reflux for 90 minutes and was then cooled to 60°C. and 115 g. of 50% sodium hydroxide and 336 g. water were added. 341 g. 50% formalin were then added slowly (a mild exotherm occurred) followed by 98 g. methanol. The mixture was then held at 60°for 45 minutes after which it was cooled to room temperature. This resin contained essentially no free phenol or formaldehyde and had a non-volatile content of about 45% and a Gardner-Holdt viscosity of about "P" at 25°C. Analysis of the resin by gel permeation chromatography showed only one significant peak. The peak was Gaussian in shape and exceptionally sharp as compared to peaks exhibited by the other phenol-formaldehyde resole resins analyzed. Based on the gel permeation chromatography date, the number-average and weight-average molecular weights of the resin were calculated to be approximately 870 and 2913, respectively.

EXAMPLE 2

A 2-liter reactor equipped with agitator, heating mantle, cooling coils and reflux condenser was charged with 758 g. USP phenol (90%), 1081 g. 37% formalin and 78.4 g. 50% sodium hydroxide. The mixture was heated to 80°C. in 100 minutes and held at 80° to Gardner-Holdt viscosity of "R" at 25°C. (approximately 400 minutes at reflux). It was then cooled to room temperature. The cooled resin had a non-volatile content of about 45% and a Gardner-Holdt viscosity of "S" at 25°C. The resulting resole resin is typical of the prior art resins which have been used in the commercial production of overlays by the beater-addition method.

EXAMPLE 3

Bleached sulfite pulp at 1.5% consistency was refined to 500 cc. Canadian Standard Freeness in a 1½ lb. laboratory beater. A 467 g. aliquot containing 7 g. dry fiber was placed in an 800 ml. beaker and 233 g. warm water was added to adjust the temperature to 32°C. and the consistency to 1%. While mildly agitating the pulp, 5.13 g. of the resin of Example 2 diluted and mixed with 5 g. water was added to the pulp slurry. This was a resin addition level of 33% resin solids based on dry fiber. After 1 minute stirring, the pH was lowered to 4.5 with 10% papermaker's alum and the mixture was slowly stirred for an additional ½ hour. The pulp-resin slurry was then added to about 5 liters of 32°C. water adjusted to pH 4.5 with $H_2SO_4$ which had been previously added to the deckle box of a 6-inch square handsheet mold. The resulting slurry was thoroughly mixed, the drain released and the sheet formed. The sheet was couched 10 times with 3 standard TAPPI blotters, placed next to a smooth caul plate and pressed for 4 minutes at 50 psi pressure against 3 new TAPPI blotters. The sheet and its adjacent blotter were placed next to a steam dryer and dried 7 minutes on each side. The essentially dry sheet was then removed from its blotter and stored in a dry place for further testing. This sheet is representative of the conventional beater-addition overlays and is designated as the "Control."

EXAMPLE 4

Example 3 was repeated with the modification that 5.13 g. of the resin of Example 1 was employed.

EXAMPLE 5

Example 3 was repeated with the modification that precipitation of the resin was effected with a 10% solution of sulfuric acid to pH 4.5.

EXAMPLE 6

Example 3 was repeated with the modifications that 5.13 g. of the resin from Example 1 was used and precipitation of the resin was effected by adjusting the resin-containing fiber slurry to a pH of 4.5 using a 10% solution of sulfuric acid.

EXAMPLE 7

Example 3 was repeated with the modification that 7.0 g. of the resin from Example 2 was employed (45% resin solids based on dry fiber) and precipitation of the resin was effected by adjusting the resin-containing slurry to pH 4.5 using a 10% solution of sulfuric acid.

EXAMPLE 8

Example 3 was repeated with the modifications that 7.0 g. of the resin of Example 1 was employed (45% resin solids based on dry fiber) and precipitation of the resin was effected by adjusting the resin-containing fiber slurry to pH 4.5 using a 10% solution of sulfuric acid.

EXAMPLE 9

Handsheets from Examples 3 through 8 were placed on sanded 5-ply ½-inch plywood panels (selected to be surface-defect-free) and cured in a heated press with a smooth aluminum caul plate over the external surface of the sheet (felt side). The press cycle was 7 minutes at 200 psi and 285°F. platen temperature. Samples of the handsheets were tested for internal bond, loss on abrasion (Taber), resin retention and wet tensile strength. Testing data appears in Table 1.

Table 1

| Sheet (Example) | Resin (Example) | Resin Solids Addition (%) | Precipitant | Internal Bond (psi) | Resin Retention (%) | Wet Loss on Abrasion ($10^{-3}$ in.) | Tensile Strength (lbs./in.)* |
|---|---|---|---|---|---|---|---|
| 3 | 2 | 33 | Alum | 386 | 45.1 | 2.0 | 76.9 |
| 4 | 1 | 33 | Alum | 547 | 59.4 | 1.33 | 79.8 |
| 5 | 2 | 33 | Sulfuric acid | 428 | 53.2 | 2.35 | 74.1 |
| 6 | 1 | 33 | Sulfuric acid | 648 | 61.3 | 1.10 | 73.5 |
| 7 | 2 | 45 | Sulfuric acid | 454 | 55.5 | 1.13 | 78.4 |
| 8 | 1 | 45 | Sulfuric acid | 813 | 61.2 | 0.73 | 93.9 |

*Pounds per inch of sample width.

The properties of the handsheets of Examples 6 and 8 were superior to those of other handsheets prepared in the same manner but using two resins prepared by a modification of the procedure described in Example 1. The modifications were that the reflux was maintained for 60 minutes for one resin and 120 minutes for the other, rather than 90 minutes used in Example 1.

EXAMPLE 10

The following procedure was employed to produce large quantities of a resin which when employed in the methods of this invention provides results substantially identical to those provided by the resin of Example 1. Into a 3,000 gallon steel kettle equipped with heating and cooling coils, reflux condenser and agitator was weighed 8,925 lbs. 90% phenol, 4091 lbs. 50% formalin and 290 lbs. water. The resulting mixture was adjusted to 30°C. and 38 lbs. 72% sulfuric acid was added. The reaction mixture was then heated to 50°C. where an exotherm began; heating was discontinued and cooling was begun. Controlling the exotherm by intermittant cooling, the temperature of the reaction mixture was allowed to slowly increase to reflux (approximately 100°C.). The heat-up time from 30°C. to reflux was approximately two hours. Shortly after reaching reflux the reaction mixture became milky, signifying the formation of two phases. Applying heat as necessary, the reflux was maintained for 90 minutes. The mixture was cooled to 60°C. in 6 minutes and 1,384 lbs. 50% sodium hydroxide and 4,000 lbs. water were added. Upon thorough mixing, the reaction mixture became clear and single-phased. The reaction mixture was reheated to 60°C. and 4,091 lbs. formalin was added. Cooling was applied to maintain the temperature at 60°C. After 20 minutes at 60°C., the resin was cooled to 50°C. and 1179 lbs. methanol was added while cooling was continued to 30°C. The resulting resole resin had a non-volatile content of 45.9%, a pH of 9.4 and a Gardner-Holdt viscosity of "R" at 25°C. Analysis of the resin by gel permeation chromatography showed only one significant peak which was of the same character as that exhibited by the resin of Example 1. Number-average and weight-average molecular weights of the resin were calculated to be approximately 893 and 2,946, respectively.

What is claimed is:

1. In a process for producing a resin-containing, cellulosic overlay useful for overlaying woody substrates comprising admixing an aqueous slurry of cellulosic fibers and an alkaline, water-solubilized, phenol-formaldehyde resole resin, precipitating said resin onto said fibers by acidification of said slurry, and forming a dry sheet from the acidified slurry, the improvement wherein:
   a. said phenol-formaldehyde resole resin is produced by condensation of phenol and formaldehyde under acidic conditions to form a novolac resin having a formaldehyde : phenol mole ratio of from 0.6 to 0.95; and methylolation of said novolac resin with sufficient additional formaldehyde to produce a resole resin having a formaldehyde : phenol mole ratio of from 1.4 to 2.0; and
   b. said acidification is effected by adding to said slurry an acid selected from sulfuric, hydrochloric, phosphoric, acetic, citric and p-toluenesulfonic acids.

2. The process of claim 1 wherein said acid is sulfuric acid.

3. The process of claim 1 wherein the formaldehyde : phenol mole ratio of said novolac resin is from 0.7:1 to 0.9:1 and the formaldehyde : phenol mole ratio of said resole resin is from 1.5 to 1.7.

4. The process of claim 3 wherein said acid is sulfuric acid.

5. The process of claim 1 wherein the formaldehyde : phenol mole ratio of said novolac resin is from 0.75 to 0.85 and the formaldehyde : phenol mole ratio of said resole resin is 1.55:1 to 1.65:1.

6. The process of claim 5 wherein said acid is sulfuric acid.

7. The process of claim 1 wherein the formaldehyde : phenol mole ratio of said novolac resin is about 0.8 and the formaldehyde : phenol mole ratio of said resole resin is about 1.6.

8. The process of claim 7 wherein said acid is sulfuric acid.

9. The process of claim 1 wherein said phenol-formaldehyde resole resin is produced by a process comprising maintaining an aqueous solution comprising phenol and formaldehyde in proportions of from 0.75 to 0.85 mole of formaldehyde per mole of phenol and having a pH of from 0.5 to 1.5 at a first temperature of at least 80°C. until substantially all said phenol has been comsumed; cooling the resulting reaction mixture; adjusting the cooled reaction mixture to a pH above about 8.0 and adding additional formaldehyde to the cooled reaction mixture; and maintaining the reaction mixture at a second elevated temperature within the range of from about 40°C. to about 80°C. until substantially all formaldehyde therein has been consumed, the amount of said additional formaldehyde being such that said resole resin has a formaldehyde : phenol mole ratio of from 1.55 to 1.65.

10. The process of claim 9 wherein said acid is sulfuric acid.

11. The process of claim 1 wherein said phenol : formaldehyde resole resin has a number-average molecular weight of from about 850 to about 950 and a weight-average molecular weight of from about 2,850 to about 3,150.

12. The process of claim 11 wherein said acid is sulfuric acid.

13. An overlay produced by the process of claim 1.
14. An overlay produced by the process of claim 2.
15. An overlay produced by the process of claim 3.
16. An overlay produced by the process of claim 4.
17. An overlay produced by the process of claim 5.
18. An overlay produced by the process of claim 6.
19. An overlay produced by the process of claim 7.
20. An overlay produced by the process of claim 8.
21. An overlay produced by the process of claim 9.
22. An overlay produced by the process of claim 10.
23. An overlay produced by the process of claim 11.
24. An overlay produced by the process of claim 12.

25. The process of claim 1 wherein said methylolation is effected at a pH of from about 8 to about 11.

26. The process of claim 1 wherein said methylolation is effected at a temperature of from 40° to 80°C.

27. The process of claim 1 wherein said methylolation is effected at a temperature of from 40° to 80°C. and at a pH of from about 8 to about 11.

28. The process of claim 3 wherein said methylolation is effected at a pH of from about 8 to about 11.

29. The process of claim 3 wherein said methylolation is effected at a temperature of from 40° to 80°C.

30. The process of claim 3 wherein said methylolation is effected at a temperature of from 40° to 80°C. and at a pH of from about 8 to about 11.

31. The process of claim 7 wherein said methylolation is effected at a pH of from about 8 to about 11.

32. The process of claim 7 wherein said methylolation is effected at a temperature of from 40° to 80°C.

33. The process of claim 7 wherein said methylolation is effected at a temperature of from 40° to 80°C. and at a pH of from about 8 to about 11.

34. In a process for producing a resin-containing, cellulosic overlay useful for overlaying woody substrates comprising admixing an aqueous slurry of cellulosic fibers and an alkaline, water-solubilized, phenol-formaldehyde resole resin, precipitating said resin onto said fibers by acidification of said slurry, and forming a dry sheet from the acidified slurry, the improvement wherein:
   a. said phenol-formaldehyde resole resin has a formaldehyde:phenol mole ratio of from 1.4 to 2.0, a number-average molecular weight of from about 850 to about 950, and a weight-average molecular weight of from about 2,850 to about 3,150, said resole resin being produced by methylolating a novolac resin having a formaldehyde:phenol mole ratio of from 0.6 to 0.95; and
   b. said acidification is effected by adding to said slurry an acid selected from sulfuric, hydrochloric, phosphoric, acetic, citric and p-toluenesulfonic acids.

* * * * *